(12) United States Patent
Cox

(10) Patent No.: US 9,708,018 B2
(45) Date of Patent: Jul. 18, 2017

(54) ARTICULATED VEHICLE

(71) Applicant: Moorend Ltd, Gloucester (GB)

(72) Inventor: Andrew Cox, Gloucester (GB)

(73) Assignee: Moorend Ltd, Gloucester (GB)

( * ) Notice: Subject to any disclaimer, the term of this patent is extended or adjusted under 35 U.S.C. 154(b) by 0 days.

(21) Appl. No.: 15/006,296

(22) Filed: Jan. 26, 2016

(65) Prior Publication Data
US 2016/0214663 A1 Jul. 28, 2016

(51) Int. Cl.
*B62D 53/02* (2006.01)

(52) U.S. Cl.
CPC .................. *B62D 53/021* (2013.01)

(58) Field of Classification Search
CPC ............................ B62D 53/021; B62D 53/023
USPC ........................................................ 280/492
See application file for complete search history.

(56) References Cited

U.S. PATENT DOCUMENTS

| | | | | |
|---|---|---|---|---|
| 2,342,407 A * | 2/1944 | Le Tourneau | ....... | B62D 53/021 280/492 |
| 4,444,409 A * | 4/1984 | Garrison | ............. | B62D 53/021 180/235 |
| 5,044,858 A | 9/1991 | Scott et al. | | |
| 5,632,350 A | 5/1997 | Gauvin | | |
| 5,873,431 A | 2/1999 | Butler et al. | | |
| 2003/0127828 A1* | 7/2003 | Seebohm | ................ | B62D 12/00 280/492 |
| 2004/0061309 A1* | 4/2004 | Shoffner | .................. | B60D 1/00 280/494 |
| 2006/0138746 A1 | 6/2006 | Donnard | | |
| 2009/0314130 A1* | 12/2009 | Dershem | ............... | B62D 53/021 74/586 |
| 2011/0127100 A1* | 6/2011 | Ahlberg | ............. | B60K 23/0808 180/245 |
| 2011/0194921 A1 | 8/2011 | Roose | | |
| 2012/0018980 A1* | 1/2012 | Karasek | ................... | B60D 5/00 280/506 |
| 2012/0023705 A1* | 2/2012 | Schmehr | ............... | F16C 11/045 16/367 |
| 2012/0211973 A1* | 8/2012 | Werner | ................. | B62D 53/025 280/781 |

FOREIGN PATENT DOCUMENTS

| | | |
|---|---|---|
| SU | 1324915 A | 7/1987 |
| WO | 2013/056418 A1 | 4/2013 |

OTHER PUBLICATIONS

Patents Act 1977: Search Report under Section 17(5), United Kingdom Intellectual Property Office, Application No. GB 1501250.3, dated Jul. 21, 2015.

* cited by examiner

*Primary Examiner* — Jacob Knutson
(74) *Attorney, Agent, or Firm* — Reichel Stohry LLP; Mark C. Reichel; Natalie J. Dean

(57) ABSTRACT

An articulated vehicle. In an exemplary embodiment, an articulated vehicle of the present disclosure comprises a first unit and a second unit articulated together by a joint, wherein the joint comprises a first slew ring arranged to permit the two units to pivot relative to one another about an axis lying substantially perpendicular to a direction of travel of the vehicle in use, and a second slew ring arranged to permit the two units to pivot relative to one another about an axis lying substantially parallel to a direction of travel of the vehicle in use.

10 Claims, 2 Drawing Sheets

ARTICULATED VEHICLE

PRIORITY

The present application is related to, and claims the priority benefit of, Great Britain Patent Application Serial No. GB 1501250.3, filed Jan. 26, 2015, the contents of which are hereby incorporated by reference in their entirety into this disclosure.

FIELD OF THE INVENTION

The present invention relates generally to an articulated vehicle and finds particular, although not exclusive, utility in dumpers.

BACKGROUND

Articulated vehicles are often used to move rock and earth and other similar materials having a cab (or tractor unit) and a trailer unit. Articulation joints are provided between the two units but the known joints are bulky adding to the weight of the vehicle and limiting the space available between the two at their juncture for other equipment, such as hydraulic pipes, and either reducing the space available for a carrying means or increasing the overall length of the vehicle.

The present invention provides a different way of articulating such vehicles.

BRIEF SUMMARY

In one aspect, the invention provides an articulated vehicle comprising a first unit and a second unit articulated together by a joint, wherein the joint comprises a first slew ring arranged to permit the two units to pivot relative to one another about an axis lying substantially perpendicular to a direction of travel of the vehicle in use, and a second slew ring arranged to permit the two units to pivot relative to one another about an axis lying substantially parallel to a direction of travel of the vehicle in use.

Slew rings are compact yet sturdy and are therefore capable of allowing the relative movement between the two units and yet at the same time increasing the available space therebetween.

The first unit may include a shovel and a cab, and the second unit may include an engine. Other possibilities are contemplated such as the first unit including a cab and engine and the second unit including a skip.

As the terrain is often uneven it is important for the articulation to allow relative motion between the two units in both a horizontal plan and a vertical plane. This promotes maximum contact between the ground engaging means provided on either side of both units with the surface on which the vehicle is travelling.

However, if the ground is very uneven such as the presence of a hole into which one ground engaging means descends it is not uncommon for that unit to overturn relative to the other unit to such an extent that the vehicle is stranded and becomes immobilized.

In one embodiment therefore, the plane of the second slew ring may be arranged at an angle of between 85 and 89 degrees to the plane of the first slew ring. In this regard the plane of a slew ring is that which passes through the circumference of the slew ring.

This may permit the two units to pivot relative to one another about an axis lying at an angle of 1 to 5 degrees out of a plane lying parallel to a direction of travel of the vehicle in use.

The angle between the two planes may be between 85 and 87 degrees and thus the axis may lie at an angle of between 3 and 5 degrees out of the plane lying parallel to a direction of travel of the vehicle in use.

The angle between the two planes may be acute and thus the axis may be inclined with an upper end towards the first unit. In this case, if the second unit starts to overturn to one side, due to the presence of a hole in the travelling surface for instance, the front end of the second unit closest to the first unit will fall relative to the rear (distal, relative to the joint) end of the second unit, and/or the rear (distal) end of the second unit will rise relative to the front end. Furthermore, as the two units rotate relative to one another the overturning of the second unit will cause the first unit to try to move such that the front (distal, relative to the joint) end of the first unit will be forced in the direction of the side on which the second unit is toppling towards. Since the first unit has its own ground engagement means, which are not in the hole, the first unit will tend to resist this movement. This leads to an increase in frictional resistance in the second slew ring thus working to resist the overturning of the second unit.

If the center of gravity of the second unit is above the axis of rotation between the two units then the toppling of the second unit relative to the first unit will move this center of gravity towards the joint (and towards the first unit). Likewise, if the center of gravity of the second unit is below the axis of rotation between the two units then the toppling of the second unit relative to the first unit will move this center of gravity away the joint (and towards the rear distal end of the second unit). Depending on the circumstances this may also help to resist toppling of the second unit.

By having the second slew ring lying at a non-perpendicular angle to the first slew ring components of any torque applied onto one side of the second slew ring will be transmitted to the other side of the slew ring. If the slew rings were perpendicular to one another there would be no such transmission from one side to another. Accordingly, the increased resistance from the first unit's ground engagement means will be transmitted through the joint and resist the overturning of the second unit.

Alternatively, the angle between the two planes may be obtuse and thus the axis may be inclined with an upper end towards the second unit. Similar effects to those described above will result and the non-perpendicular nature of the two slew rings will allow force from one side to be passed through to the other side of the second slew ring thus resisting the overturning of either the first or second units depending on the circumstances.

In situations where toppling is not occurring this arrangement of slew rings may increase the "stiffness" of the articulation leading to a smoother journey which may be advantageous in certain situations.

Furthermore, because some or all of the ground engagement means tend to remain in contact with the ground, greater traction is provided leading to less loss of vehicle speed.

The second slew ring may be configured to allow 360 degree rotation of the first unit relative to the second unit. However, the vehicle may further comprise rotation limitation means for limiting the rotation of the second slew ring. The rotation limitation means may limit the rotation of the first unit relative to the second unit to 60 degrees. The rotation limitation means may limit the rotation of the first unit relative to the second unit to 30 degrees. The rotation limitation means may limit the rotation of the first unit relative to the second unit to 15 degrees.

The rotation limiting means may comprise brackets attached to one unit which abut against the other unit as they rotate relative to one another. Alternatively, the slew ring may include stops attached to each side which abut against one another.

Either or both of the first and second units may comprise continuous tracks. Wheeled vehicles are also contemplated.

The vehicle may be a dumper.

BRIEF DESCRIPTION OF THE DRAWINGS

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

DETAILED DESCRIPTION

Figure 1:
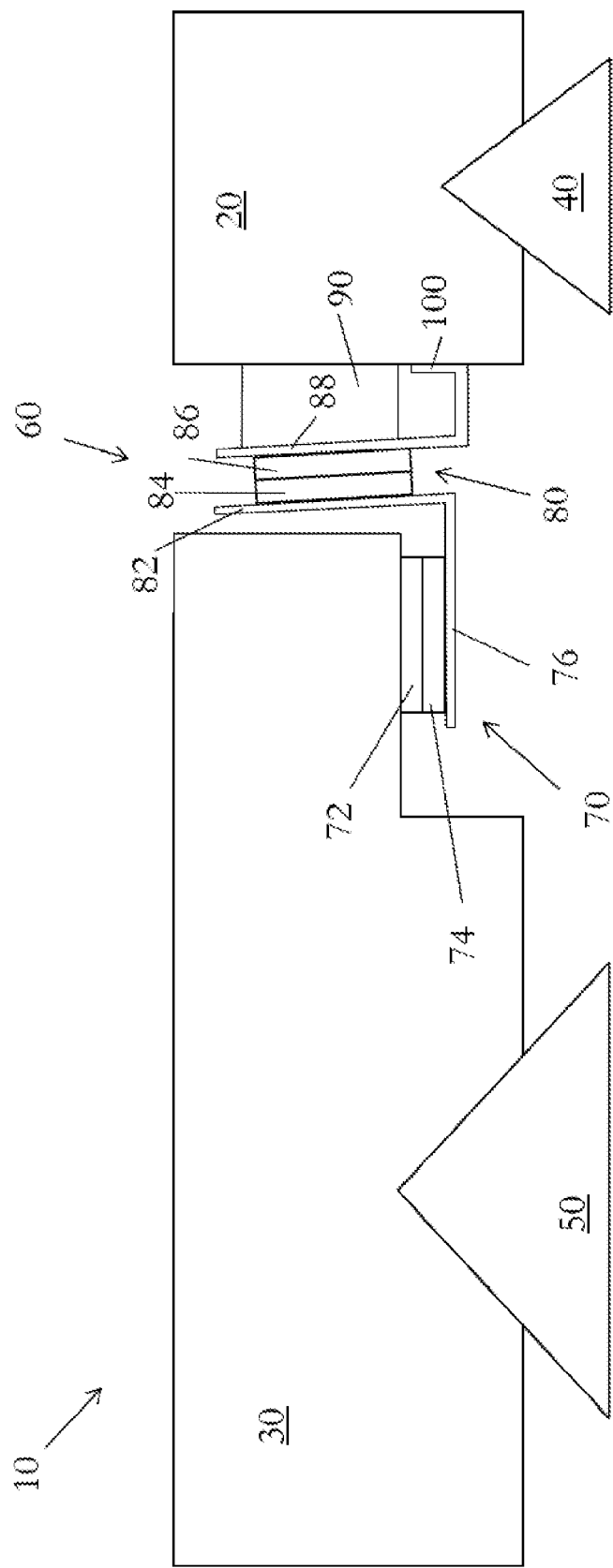
FIG. 1 is an elevational schematic view of an articulated vehicle.

The present invention will be described with respect to certain drawings but the invention is not limited thereto but only by the claims. The drawings described are only schematic and are non-limiting. Each drawing may not include all of the features of the invention and therefore should not necessarily be considered to be an embodiment of the invention. In the drawings, the size of some of the elements may be exaggerated and not drawn to scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that operation is capable in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that operation is capable in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "an embodiment" or "an aspect" means that a particular feature, structure or characteristic described in connection with the embodiment or aspect is included in at least one embodiment or aspect of the present invention. Thus, appearances of the phrases "in one embodiment", "in an embodiment", or "in an aspect" in various places throughout this specification are not necessarily all referring to the same embodiment or aspect, but may refer to different embodiments or aspects. Furthermore, the particular features, structures or characteristics of any embodiment or aspect of the invention may be combined in any suitable manner, as would be apparent to one of ordinary skill in the art from this disclosure, in one or more embodiments or aspects.

Similarly, it should be appreciated that in the description various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Moreover, the description of any individual drawing or aspect should not necessarily be considered to be an embodiment of the invention. Rather, as the following claims reflect, inventive aspects lie in fewer than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some features included in other embodiments, combinations of features of different embodiments are meant to be within the scope of the invention, and form yet further embodiments, as will be understood by those skilled in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In the discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The use of the term "at least one" may mean only one in certain circumstances.

The principles of the invention will now be described by a detailed description of at least one drawing relating to exemplary features of the invention. It is clear that other arrangements can be configured according to the knowledge of persons skilled in the art without departing from the underlying concept or technical teaching of the invention, the invention being limited only by the terms of the appended claims.

In FIG. 1, an articulate vehicle 10 is shown schematically. It comprises a tractor unit 20 and a trailer unit 30. Each unit has its own ground engaging means 40, 50 in the form of continuous "high drive" tracks.

The vehicle 10 includes an articulated joint 60 which comprises a horizontally oriented slew ring 70. The slew ring has two parts 72, 74 freely rotatable relative to one another. One part 72 is affixed to the underside of the trailer unit 30 and the other part 74 is affixed to a bracket 76.

The bracket 76 extends horizontally in the form a plate towards the tractor unit 20. It then extends upwardly 82 but at an angle away from the true vertical (or less than 90 degrees from the horizontal plate part 76 of the bracket).

A corresponding bracket in the form of a plate 88 is affixed to the tractor unit 20 by means of a "U" shape connector piece 100 at its lower end. This plate 88 may include an aperture for control equipment to pass through, such as hydraulic hoses and the like. The plate 88 is also supported from the rear external surface of the tractor unit 20 by a cylinder 90.

The plate 88 also lies away from the true vertical and is arranged to be parallel with the plate 82 with the vehicle on level ground.

Between the two plates 82, 88 another slew ring 80 is provided. One side 84 of the slew ring is affixed to the plate 82, and the other side 86 of the slew ring 80 is affixed to the plate 88.

The plates and brackets comprise steel plate.

Figure 2:
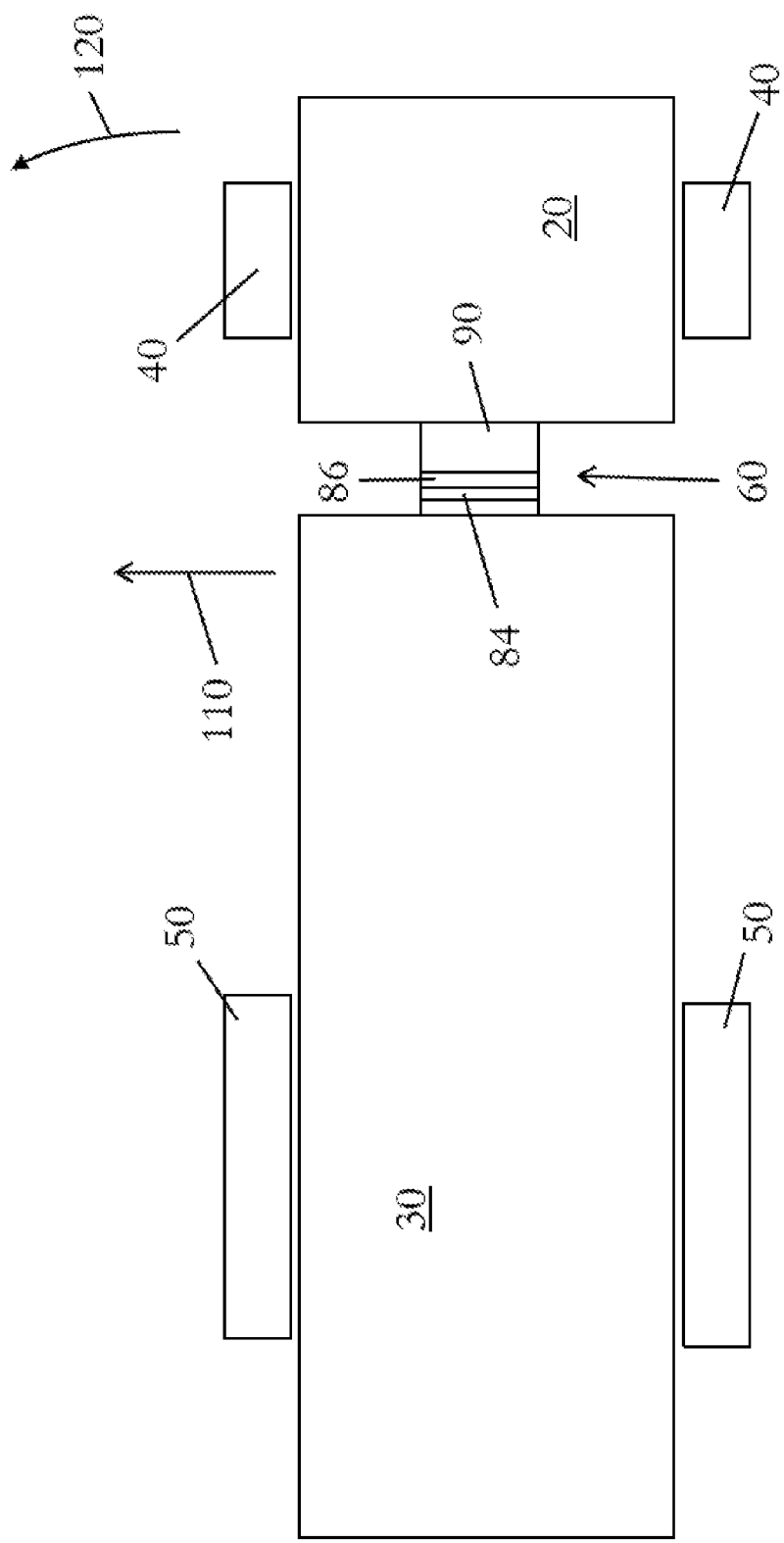
FIG. 2 is a schematic plan view of an articulated vehicle.

In FIG. 2, the vehicle 10 is shown in plan comprising the tractor unit 20 and the trailer unit 30 each with ground engaging means 40, 50.

The articulated joint 60 can be seen comprising the almost-vertical slew ring components 84, 86. The tractor unit 20 support 90 is also shown but not the plates 82, 88 to improve its clarity.

If the trailer unit 30 meets a hole in the road on the left hand side (in the direction of travel which is with the tractor unit at the front) then the ground engaging means 50 will try to drop into the hole. The trailer unit 30 will then want to turn in an anti-clockwise direction when viewed from behind, and as indicated by arrow "110".

Due to the slew ring 80 being non-perpendicular to the ground surface over which the vehicle is travelling (leaving aside the hole) the tractor unit 20 will be urged to turn relative to the trailer unit in a circular-like movement about an approximate center of radius located at the articulated joint 60, and as indicated by arrow "120". However, the ground engaging means 40 of the tractor unit will resist this movement and therefore forces will be transmitted through the joint 60 to the trailer unit 30. The ground engaging means 50 of the trailer unit which encountered the hole will thus be prevented from dropping into it. In other words, the tractor unit will substantially help to keep the trailer unit level even when it is unsupported on one side.

In a similar manner the trailer unit 30 may help to support the tractor unit 20 when it encounters uneven ground.

Although the vehicle 10 has been described as a tractor and trailer unit it will be understood that it may have two units of other types such as the two halves of an articulated front-end loader.

The invention claimed is:

1. An articulated vehicle comprising a first unit and a second unit articulated together by a joint, wherein the joint comprises a first slew ring arranged to permit the two units to pivot relative to one another about an axis lying substantially perpendicular to a direction of travel of the vehicle in use, and a second slew ring arranged to permit the two units to pivot relative to one another about an axis lying substantially parallel to the direction of travel of the vehicle in use.

2. The articulated vehicle according to claim 1, wherein the first slew ring has a plane passing through a circumference of the first slew ring and the second slew ring has a plane passing through a circumference of the second slew ring, and wherein the vehicle is arranged such that an angle between the two planes is acute.

3. The articulated vehicle according to claim 2, wherein the angle between the two planes is between 85 and 89 degrees.

4. The articulated vehicle according to claim 1, wherein the first slew ring has a plane passing through a circumference of the first slew ring and the second slew ring has a plane passing through a circumference of the second slew ring, and wherein the vehicle is arranged such that an angle between the two planes is obtuse.

5. The articulated vehicle according to claim 1, wherein the second slew ring is configured to allow 360 degree rotation of the first unit relative to the second unit.

6. The articulated vehicle according to claim 1, further comprising a rotation limiter for limiting the rotation of the second slew ring.

7. The articulated vehicle according to claim 6, wherein the rotation limiter limits the rotation of the first unit relative to the second unit to 60 degrees.

8. The articulated vehicle according to claim 6, wherein the rotation limiter limits the rotation of the first unit relative to the second unit to 30 degrees.

9. The articulated vehicle according to claim 6, wherein the rotation limiter limits the rotation of the first unit relative to the second unit to 15 degrees.

10. The articulated vehicle according to claim 1, wherein the vehicle is a dumper.

* * * * *